(12) United States Patent
Nakamura et al.

(10) Patent No.: US 11,760,684 B2
(45) Date of Patent: Sep. 19, 2023

(54) GLASS COMPOSITION AND GLASS PRODUCT USING SAME

(71) Applicant: Nippon Sheet Glass Company, Limited, Tokyo (JP)

(72) Inventors: Aya Nakamura, Hyogo (JP); Masanori Shojiya, Hyogo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 763 days.

(21) Appl. No.: 16/624,794

(22) PCT Filed: Oct. 11, 2017

(86) PCT No.: PCT/JP2017/036810
§ 371 (c)(1),
(2) Date: Dec. 19, 2019

(87) PCT Pub. No.: WO2019/003464
PCT Pub. Date: Jan. 3, 2019

(65) Prior Publication Data
US 2020/0140320 A1 May 7, 2020

(30) Foreign Application Priority Data
Jun. 29, 2017 (JP) ................................. 2017-127967

(51) Int. Cl.
C03C 3/085 (2006.01)
C03C 13/00 (2006.01)
C03C 12/00 (2006.01)
C03C 3/087 (2006.01)
C03C 3/091 (2006.01)
C08J 5/04 (2006.01)
D01F 9/08 (2006.01)

(52) U.S. Cl.
CPC .............. *C03C 3/085* (2013.01); *C03C 3/087* (2013.01); *C03C 3/091* (2013.01); *C03C 12/00* (2013.01); *C03C 13/00* (2013.01); *C08J 5/042* (2013.01); *D01F 9/08* (2013.01)

(58) Field of Classification Search
CPC ......... C03C 3/091; C03C 3/085; C03C 3/087; C03C 12/00; C03C 13/00; C08J 5/042; D01F 9/08; D02G 3/18
See application file for complete search history.

(56) References Cited

U.S. PATENT DOCUMENTS

| 6,376,084 B1 | 4/2002 | Kishimoto et al. | |
| 2001/0016552 A1 | 8/2001 | Goto et al. | |
| 2011/0039681 A1 | 2/2011 | Lecomte | |
| 2013/0210602 A1* | 8/2013 | Nonaka | C03C 13/06 501/35 |
| 2015/0018194 A1 | 1/2015 | Li et al. | |
| 2015/0259243 A1 | 9/2015 | McGinnis et al. | |
| 2016/0068428 A1* | 3/2016 | Li | C03C 3/095 501/38 |
| 2016/0326045 A1 | 11/2016 | Li | |

FOREIGN PATENT DOCUMENTS

| CN | 101549958 | 10/2009 | |
| CN | 101580344 | 11/2009 | |
| JP | 55126548 A * | 9/1980 | ............. C03C 3/102 |
| JP | S55126548 | 9/1980 | |
| JP | H0729815 | 4/1995 | |
| JP | H1121147 | 1/1999 | |
| JP | 2000236147 | 8/2000 | |
| JP | 2000313634 | 11/2000 | |
| JP | 2011518748 | 6/2011 | |
| JP | 2012025649 | 2/2012 | |
| WO | 2006057405 | 6/2006 | |
| WO | 2011155362 | 12/2011 | |
| WO | 2016040425 | 3/2016 | |

OTHER PUBLICATIONS

International Search Report and Written Opinion issued for International Patent Application No. PCT/JP2017/036810, dated Jan. 16, 2018, 9 pages including English translation of Search Report.
Extended European Search Report issued for European Patent Application No. 17916371.2, dated Feb. 18, 2021, 7 pages.

* cited by examiner

*Primary Examiner* — Elizabeth A. Bolden
(74) *Attorney, Agent, or Firm* — Hamre, Schumann, Mueller & Larson, P.C.

(57) ABSTRACT

The present invention provides a glass composition not requiring a large quantity of rare earth material, producible by a common apparatus for producing a glass, having a high Young's modulus and a large crack initiation load, and suitable for glass fibers etc. A glass composition according to the present invention contains, in mol %: 50 to 65% $SiO_2$; 7.5 to 26% $Al_2O_3$; 15 to 30% MgO; 0 to 8% CaO; 0 to 3% $B_2O_3$; 0 to 3% $Li_2O$; and 0 to 0.2% $Na_2O$. In this glass composition, a total content of MgO and CaO is in a range of 18 to 35 mol %, and a mol ratio calculated by $Al_2O_3/(MgO+CaO)$ is less than 1.

18 Claims, 1 Drawing Sheet

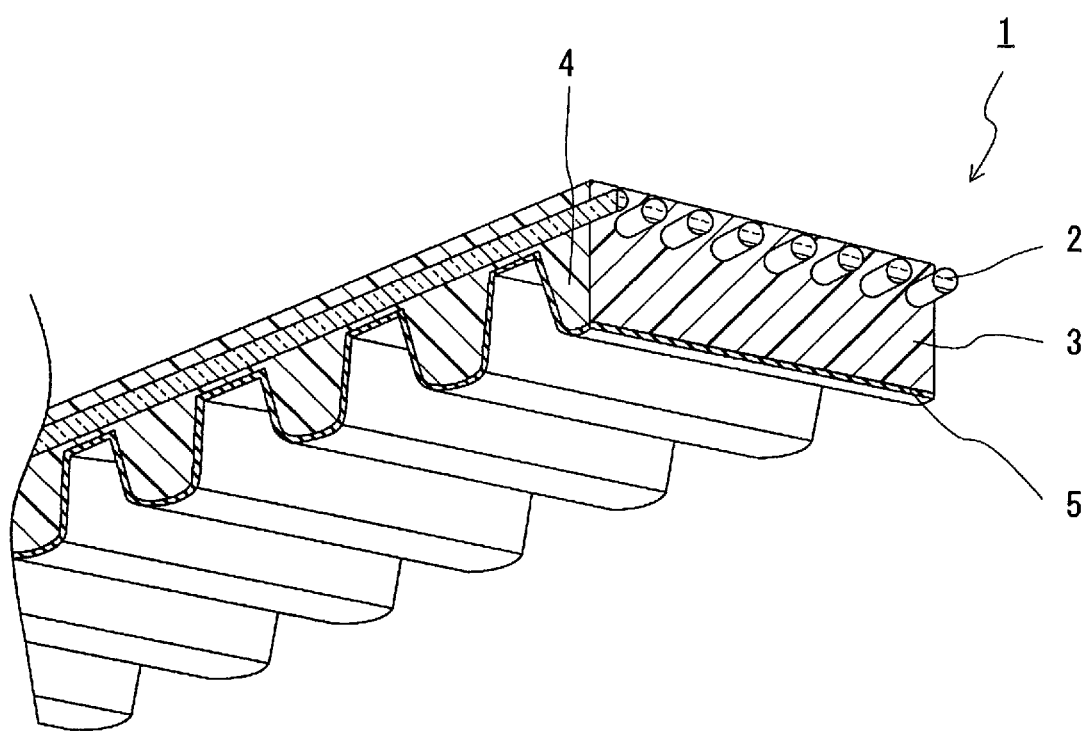

GLASS COMPOSITION AND GLASS PRODUCT USING SAME

TECHNICAL FIELD

The present invention relates to a glass composition suitable for glass fibers, etc. specifically to a glass composition suitable for a glass fiber product such as a rubber-reinforcing cord or a glass fiber nonwoven fabric, suitable for a particulate glass product to be used as a filler, etc. or suitable for other uses, and to a glass product composed of this glass composition.

BACKGROUND ART

Rubber-reinforcing cords are used as reinforcing members for rubber products that are repeatedly subjected to bending stress. Rubber-reinforcing cords embedded in a rubber product such as a rubber belt or a tire suppress elongation of the rubber product and degradation of its strength, and contribute to increasing dimensional stability of the rubber product and to extending fatigue life thereof. Not only aramid fibers, carbon fibers, polyester fibers, etc. but also glass fibers are known as fibers for composing a rubber-reinforcing cord.

Patent Literature 1 discloses glass fibers composed of a glass composition having a high elastic modulus as glass fibers suitable for a rubber-reinforcing cord. Although many glass compositions provided for a practical use have a Young's modulus (a tensile elastic modulus) of 90 GPa or less, the glass composition of Patent Literature 1 has a Young's modulus of more than 100 GPa. This glass composition includes, in wt %: 10 to 40% $SiO_2$; 10 to 30% $Al_2O_3$; and 20 to 60% $Y_2O_3+La_2O_3$ as essential components.

Patent Literature 2 discloses a glass composition including, in wt %: 60 to 70% $SiO_2$; 17 to 27% $Al_2O_3$; 7 to 17% MgO; and 0.1 to 1.0% transition metal oxide, for the purpose of providing glass fibers suitable for printed wiring boards. $Fe_2O_3$, $TiO_2$, $CeO_2$, etc. are exemplified as the transition metal oxide. According to Patent Literature 2, a component having a refining effect such as a fluorine component or a sulfurous acid component is only acceptable up to a ceiling of 0.5 wt % as a component of the glass composition other than those mentioned above.

Patent Literature 3 discloses glass fibers including an oxynitride glass in order to provide glass fibers having a high strength. The oxynitride glass is a glass in which a part of oxygen atoms in a oxide glass are replaced with nitrogen atoms. The glass fibers of Patent Literature 3 includes nitride such as silicon nitride and a content of the nitride exceeds 10 wt %.

CITATION LIST

Patent Literature

Patent Literature 1: WO 2006/057405 A1
Patent Literature 2: JP 11(1999)-021147 A
Patent Literature 3: JP 07(1995)-029815 B

SUMMARY OF INVENTION

Technical Problem

Although the glass composition disclosed in Patent Literature 1 has the high Young's modulus, the glass composition requires that the content of $Y_2O_3$ and/or $La_2O_3$ is 20 wt % or more. Therefore, its production requires a considerable quantity of rare earth material and a production cost increase. Due to the rare earth oxide content being 20 wt % or more, this glass composition gets relatively heavy.

According to studies by the present inventors, in actuality, an elastic modulus of glass fibers disclosed in Patent Literature 2 does not increase to a level required in a part of glass fiber products represented by rubber-reinforcing cords. It can be thought that this is because the content of $SiO_2$ is too high in the glass composition. In the example of the composition specifically disclosed in Patent Literature 2 ($SiO_2$: 64.6 wt % or more in Tables 1 and 2), the range of content of $SiO_2$ exceeds 65% in terms of mol %.

Such oxynitride glass disclosed in Patent Literature 3 needs to be produced by melting glass raw material under a nitrogen atmosphere. Further, for an inner wall of a furnace in which the raw material of the oxynitride glass is melted, a platinum-based material, which is typically used when a glass is melted, cannot be used, and a special material is needed.

In order to provide glass fibers having a high strength, a glass composition having a high elastic modulus, specifically having a high Young's modulus, is appropriate. However, a practical strength of glass fibers is affected by the generation of micro cracks and breaking upon an extension of them. A strength against the micro cracks greatly depends on not only a Young's modulus but also a crack initiation load. Therefore, in order to obtain glass fibers having a high strength, it is desirable to use a glass composition having a high Young's modulus and a large crack initiation load. In recent years, a particulate glass used as a filler for reinforcing a base material such as plastic is also required to have a higher strength.

In view of the above circumstances, it is an object of the present invention to provide a glass composition having a high Young's modulus and a large crack initiation load within a range of a composition not requiring a large quantity of rare earth material and producible by a common apparatus for producing a glass.

Solution to Problem

The present invention provides a glass composition containing, in mol %: 50 to 65% $SiO_2$; 7.5 to 26% $Al_2O_3$; 15 to 30% MgO; 0 to 8% CaO; 0 to 3% $B_2O_3$; 0 to 3% $Li_2O$; and 0 to 0.2% $Na_2O$. In this glass composition, a total content of MgO and CaO is in a range of 18 to 35 mol %, and a mol ratio calculated by $Al_2O_3/(MgO+CaO)$ is less than 1.

Advantageous Effects of Invention

According to the present invention, it is possible to provide a glass composition having a high Young's modulus and a large crack initiation load within a range of a composition not requiring a large quantity of rare earth material and producible by a common apparatus for producing a glass.

BRIEF DESCRIPTION OF DRAWINGS

FIG. 1 shows an example of a structure of a toothed rubber belt containing rubber-reinforcing cords that are glass fiber products of the present invention.

DESCRIPTION OF EMBODIMENTS

Hereinafter, the present invention will be described in detail. The following description is not intended to limit the present invention to specific embodiments. Hereinafter, the percentages of the components of glass compositions are all expressed in mol %, unless otherwise specified. The phrase "being substantially free of a component" means that the content of the component is 0.1 mol % or less, preferably less than 0.08 mol %, and more preferably less than 0.05 mol %. The phrase "particulate" means a particle of which the largest diameter is 5 mm or less, preferably 3 mm or less, and more preferably 1 mm or less.

[Each Component of Glass Composition]

($SiO_2$)

$SiO_2$ is a component that forms the glass network. The content of $SiO_2$ is adjusted to the range of 50 to 65%. The content of $SiO_2$ is preferably 52% or more, further preferably 53% or more, and particularly preferably 54% or more. The content of $SiO_2$ may be 56% or more or even 57% or more in some cases. If the content of $SiO_2$ is too high, the Young's modulus may decrease. Therefore, the content of $SiO_2$ is preferably 62% or less, further preferably 61% or less, and particularly preferably 60% or less. The content of $SiO_2$ may be 59% or less or even 58% or less in some cases.

The content of $SiO_2$ in the glass composition disclosed in Patent Literature 2 and converted to terms of mol % exceeds 65%.

($Al_2O_3$)

$Al_2O_3$ is a component that contributes to the maintenance of heat resistance, water resistance, etc. of the glass composition and that also affects the devitrification temperature, viscosity, etc. thereof. The content of $Al_2O_3$ is adjusted to the range of 7.5 to 26%. The content of $Al_2O_3$ is preferably 9% or more, further preferably 10% or more, and particularly preferably 11% or more. The content of $Al_2O_3$ may be 12% or more or even 14% or more in some cases. If the content of $Al_2O_3$ is too high, the liquidus temperature may significantly increase and affect the production. Therefore, the content of $Al_2O_3$ is preferably 24% or less, and further preferably 22% or less. The content of $Al_2O_3$ may be 20% or less or even 19% or less in some cases.

Particularly, in terms of mass production, it is preferable that the devitrification temperature of the glass composition is sufficiently lower than the liquidus temperature thereof. The content of $Al_2O_3$ that is suitable for lowering the devitrification temperature below the liquidus temperature sufficiently is 11 to 15%, further 11 to 14%, and particularly 11.5 to 13.5%. As described below, in order to lower the devitrification temperature sufficiently compared to the liquidus temperature, it is recommended to add a proper quantity of $Li_2O$ and/or $B_2O_3$.

The content of $Al_2O_3$ that is suitable for increasing the crack initiation load sufficiently is 15 to 26%, further 16 to 22%, and particularly 17 to 21%.

(MgO)

MgO is a component that contributes to an increase in Young's modulus and that also affects the devitrification temperature, viscosity, etc. The content of MgO is adjusted to the range of 15 to 30%. The content of MgO is preferably 17% or more, further preferably 18% or more, and particularly preferably 20% or more. The content of MgO may be 21% or more or even 22% or more in some cases. If the content of MgO is too high, the liquidus temperature may significantly increase. Therefore, the content of MgO is preferably 29% or less. The content of MgO may be 28% or less or even 27% or less in some cases.

The content of MgO that is suitable for lowering the devitrification temperature below the liquidus temperature sufficiently is 18 to 30%, and further 20 to 28%.

The content of MgO that is suitable for increasing the crack initiation load sufficiently is 17 to 30%, further 18 to 26%, and particularly 22 to 26%.

(CaO)

CaO is an optional component that contributes to the maintenance of water resistance, etc. and that affects the devitrification temperature, viscosity, etc. The content of CaO is adjusted to the range of 0 to 8%. It is preferable to add a proper quantity of CaO to lower the liquidus temperature. Therefore, it is preferable to add CaO (the content of CaO is preferably more than 0%). The content of CaO is preferably 0.1% or more, and further preferably 0.12% or more. The content of CaO may be 2% or more or even 3% or more in some cases. However, if the content of CaO is too high, the Young's modulus may decrease. Therefore, the content of CaO is preferably 7% or less, and further preferably 5% or less. The content of CaO that is particularly suitable for improving the Young's modulus and the crack initiation load is less than 1%.

<Total Content of MgO and CaO>

The total content of MgO and CaO is adjusted to the range of 18 to 35%, and preferably 20 to 30%.

<($Al_2O_3$)/(MgO+CaO)>

The mol ratio of the $Al_2O_3$ content to the total content of MgO and CaO is adjusted to less than 1. This facilitates the achievement of both the high Young's modulus and the not-too-high liquidus temperature. The mol ratio of $Al_2O_3$/(MgO+CaO) is preferably in the range of 0.3 to 0.9, and particularly preferably 0.35 to 0.85. The mol ratio of $Al_2O_3$/(MgO+CaO) may be in the range of 0.4 to 0.7 or even 0.4 to 0.6 in some cases. However, the mol ratio of $Al_2O_3$/(MgO+CaO) that is particularly suitable for improving the crack initiation load is 0.7 or more and less than 1, further 0.7 or more and 0.9 or less, and particularly 0.8 or more and 0.9 or less.

($B_2O_3$)

$B_2O_3$ is an optional component that forms the glass network and that affects the property such as devitrification temperature or viscosity. The content of $B_2O_3$ is adjusted to the range of 0 to 3%. Addition of a small amount of $B_2O_3$ may contribute to a decrease in the devitrification temperature. Therefore, it is preferable to add $B_2O_3$ (the content of $B_2O_3$ is preferably more than 0%). The content of $B_2O_3$ is preferably 0.1% or more, and particularly preferably 0.3% or more. The content of $B_2O_3$ may be 0.5% or more or even 0.7% or more in some cases. However, if the content of $B_2O_3$ is too high, the Young's modulus may decrease. The content of $B_2O_3$ is preferably 2.5% or less, further preferably 2% or less, and particularly preferably 1.8% or less. The content of $B_2O_3$ may be 1.6% or less or even 1.5% or less in some cases. Examples of the preferable range of the content of $B_2O_3$ include 0.1 to 1.6%.

($Li_2O$)

$Li_2O$ is an optional component that modifies the glass network and that affects the property such as liquidus temperature, devitrification temperature, or viscosity. The content of $Li_2O$ is adjusted to the range of 0 to 3%. Addition of $Li_2O$ in this range has an effect on a decrease in the devitrification temperature. Therefore, it is preferable to add $Li_2O$ (the content of $Li_2O$ is preferably more than 0%). The content of $Li_2O$ is preferably 0.1% or more, further preferably 0.2% or more, and particularly preferably 0.3% or more. The content of $Li_2O$ may be 0.5% or more or even 0.7% or more in some cases. If the content of $Li_2O$ is too high, the Young's modulus may decrease. Therefore, the content of $Li_2O$ is preferably 2.5% or less, further preferably 2% or less, and particularly preferably 1.8% or less. The content of $Li_2O$ may be 1.6% or less or even 1.5% or less in some cases. Examples of the preferable range of the content of $Li_2O$ include 0.2 to 2.5% and the range that is higher than the content of $Na_2O$.

<Co-Presence of $B_2O_3$ and $Li_2O$>

The co-presence of $B_2O_3$ and $Li_2O$ ($B_2O_3$>0% and $Li_2O$>0%) facilitates the appropriate adjustment of the liquidus temperature and the devitrification temperature of the glass. The total content of $B_2O_3$ and $Li_2O$ is preferably 0.1% or more, further preferably more than 0.5%, particularly preferably 0.7% or more, and it may be 1% or more in some cases. This total content is preferably 5.5% or less, further preferably 5% or less, particularly preferably 4%, and it may be 3.5% or less in some cases.

In terms of an improvement of properties, addition of $B_2O_3$ and $Li_2O$ at an appropriate ratio is advantageous. The range of the mole ratio expressed by $B_2O_3/Li_2O$ is preferably 0.2 to 5, further preferably 0.4 to 2.5, particularly preferably 0.5 to 2, and it is preferably 0.8 to 1.25 in some cases.

($Na_2O$)

Like $Li_2O$, $Na_2O$ is an optional component that affects the property such as liquidus temperature, devitrification temperature, or viscosity. However, since $Na_2O$ has a higher effect on a decrease in the Young's modulus than $Li_2O$, the content of $Na_2O$ is adjusted to the range of 0 to 0.2%. Although it is generally desirable that the glass composition is free of $Na_2O$, in terms of refining the glass melt, addition of $Na_2O$ is preferable so that $Na_2O$ is contained in an amount of up to 0.2%, further preferably in an amount of up to 0.15%, and, for example, in the range of more than 0% and less than 0.1%.

<Total Content of Components Described Above>

The total content of the 7 components described above ($SiO_2$, $Al_2O_3$, MgO, CaO, $B_2O_3$, $Li_2O$, and $Na_2O$) is preferably 95% or more, further preferably 97% or more, particularly preferably 98% or more, and especially preferably 99% or more. The total content of the 7 components may be more than 99.5% or even more than 99.9%, and may be 100% in some cases. The embodiment in which the total content of the 7 components is 100% means that the glass composition consists only of $SiO_2$, $Al_2O_3$, MgO, CaO, $B_2O_3$, $Li_2O$, and $Na_2O$.

<Additional Components>

Examples of the additional components other than the 7 components described above are included below. However, the following description does not limit the additional components. Further, the following description about the content of the additional components is only illustrative.

($K_2O$)

Like $Li_2O$, $K_2O$ is also an optional component that affects the property such as liquidus temperature, devitrification temperature, or viscosity, and that has an effect on a facilitation of refining of the glass melt. However, since $K_2O$ has an even higher effect on a decrease in Young's modulus than $Na_2O$, the content of $K_2O$ is preferably adjusted to the range of 0 to 0.1%, further preferably adjusted to the range of 0 to 0.05%, and particularly preferably adjusted to the range of 0 to 0.03%.

(SrO)

SrO is also an optional component that affects the property such as liquidus temperature, devitrification temperature, or viscosity. However, addition of SrO may also decrease Young's modulus. Further, if the content of SrO is too high, the homogeneity of the glass melt may be reduced. Therefore, the content of SrO is preferably adjusted to the range of 0 to 5%. The content of SrO is preferably 3% or less, further preferably 1% or less, particularly preferably 0.5% or less, and especially preferably 0.1% or less. The content of SrO is preferably adjusted so that the total content of SrO and CaO is adjusted to 8% or less, further 6% or less, and particularly 5% or less.

(BaO)

BaO is also an optional component that affects the property such as liquidus temperature, devitrification temperature, or viscosity. However, addition of BaO may decrease Young's modulus significantly. Further, BaO is a component that imposes a large burden on the environment and working environment. Therefore, it is preferable that the glass composition is substantially free of BaO.

(Transition Metal Oxide Etc.)

The glass composition may contain oxide of transition elements (groups 3 to 11 elements of the periodic table), which is referred to as transition metal oxide, as the additional components. $TiO_2$, $ZrO_2$, $Fe_2O_3$, $Y_2O_3$, $La_2O_3$, and $CeO_2$ are exemplified as transition metal oxides. The glass composition may also contain ZnO, which is oxide of group 12 element, as the additional component. Although it is generally desirable that the glass composition is free of these oxides, these oxides may be unavoidably mixed as impurities derived from the raw material or the apparatus for producing. Depending on species of oxide, a small amount of oxide to be added may have an effect as a refining agent. The total content of oxides of groups 3 to 12 elements is preferably 3% or less, further preferably 1% or less, particularly preferably 0.5% or less, and it may be limited to 0.1% or less if necessary. The content of each transition metal oxide is preferably 0.5% or less, particularly preferably 0.3% or less, and especially preferably 0.1% or less.

In this description, the content of oxide of a transition element that has different valences in the glass composition is calculated by assuming an oxide in which the metal has the maximum oxidation number. For example, iron oxide is usually present in the form of $Fe_2O_3$ or FeO in the glass composition. Therefore, the content of iron oxide, which is commonly expressed as "$T\text{-}Fe_2O_3$", is the total content of iron oxide that is present in the form of FeO and as calculated in terms of $Fe_2O_3$, and iron oxide that is present in the form of $Fe_2O_3$.

(Other Components)

$SnO_2$, $Sb_2O_3$, $Sb_2O_5$, $SO_3$, Cl, and F are exemplified as the additional components other than the components described above. These components may act as a refining agent. $Ga_2O_3$ and $P_2O_5$ are also exemplified as other additional components. The content of each of $SnO_2$ to $P_2O_5$ exemplified in this paragraph is also preferably 0.5% or less, particularly preferably 0.3% or less, and especially preferably 0.1% or less.

<Illustrating Preferred Embodiments of the Glass Composition>

In an embodiment of the present invention, the glass composition is substantially free of oxide of rare earth element. In another embodiment of the present invention, the glass composition contains 0 to 0.5% $T\text{-}Fe_2O_3$ and is substantially free of divalent metal oxide except for MgO, CaO, and FeO. In another embodiment of the present invention, the glass composition is substantially free of alkali metal oxide except for $Li_2$ and $Na_2O$. In another embodiment of the present invention, the glass composition is substantially free of $TiO_2$ and $ZrO_2$. In another embodiment of the present invention, the content of nitride is 10 wt% or less, and it is preferable that the glass composition is substantially free of nitride.

In an embodiment of the present invention, the total content of the 7 components described above ($SiO_2$, $Al_2O_3$, MgO, CaO, $B_2O_3$, $Li_2O$, and $Na_2O$) and the 5 additional components ($K_2O$, SrO, $TiO_2$, $ZrO_2$, and T-$Fe_2O_3$) in the glass composition is 99% or more, further 99.5% or more, particularly 99.9% or more, especially 99.95% or more, and it is 100% in some cases. In this embodiment, the content of each of the 5 additional components is as follow: 0 to 0.05% $K_2O$; 0 to 5% SrO; 0 to 0.1% $TiO_2$; 0 to 0.1% $ZrO_2$; and 0 to 0.5% T-$Fe_2O_3$.

In an embodiment of the present invention, the total content of the 7 components described above ($SiO_2$, $Al_2O_3$, MgO, CaO, $B_2O_3$, $Li_2O$, and $Na_2O$) and the 3 additional components ($K_2O$, $TiO_2$, and T-$Fe_2O_3$) in the glass composition is 99% or more, further 99.5% or more, particularly 99.9% or more, especially 99.95% or more, and it is 100% in some cases. In this embodiment, the content of each of the 3 additional components is as follow: 0 to 0.05% $K_2O$; 0 to 0.1% $TiO_2$; and 0 to 0.5% T-$Fe_2O_3$.

In an embodiment of the present invention, the glass composition contains: 53 to 60% $SiO_2$; 11 to 15% $Al_2O_3$; 18 to 30% MgO; 0 to 5% CaO; 0.2 to 1.5% $B_2O_3$; 0.5 to 2.5% $Li_2O$; and 0 to 0.2% $Na_2O$. In this glass composition, the mol ratio calculated by $Al_2O_3/(MgO+CaO)$ is 0.3 to 0.5. The total content of MgO and CaO in this glass composition is in the range of 18 to 35%. This embodiment is particularly suitable for adjusting the devitrification temperature to a preferable range in view of the relationship with the liquidus temperature, etc.

In an embodiment of the present invention, the glass composition contains: 53 to 60% $SiO_2$; 15 to 26% $Al_2O_3$; 17 to 30% MgO; 0 to 5% CaO; 0.2 to 3% $B_2O_3$; 0.2 to 1.5% $Li_2O$; and 0 to 0.2% $Na_2O$. In this glass composition, the mol ratio calculated by $Al_2O_3/(MgO+CaO)$ is 0.5 or more and less than 1, and preferably 0.7 to 0.9. The total content of MgO and CaO in this glass composition is in the range of 18 to 35%. This embodiment is particularly suitable for increasing crack initiation load.

[Properties of the Glass Composition]

(Specific Gravity)

In an embodiment of the present invention, the specific gravity of the glass composition is 3.0 or less, preferably 2.8 or less, and more preferably 2.7 or less. The lower limit of the specific gravity is not particularly limited, but it may be 2.5 or more. The specific gravity of the glass composition disclosed in Patent Literature 1 that contains a considerable quantity of rare earth element exceeds 3.

(Young's Modulus)

In an embodiment of the present invention, the Young's modulus of the glass composition is 98 GPa or more, and preferably 100 GPa or more. The upper limit of the Young's modulus is not particularly limited, but it may be 110 GPa or less, and may further be 105 GPa or less. The method of measuring the Young's modulus is described in the Examples. The glass composition having high Young's modulus is suitable for providing glass fibers in which the extent of deformation by tensile stress is small.

(Crack Initiation Load)

In an embodiment of the present invention, the crack initiation load of the glass composition is 300 g or more, preferably 400 g or more, and more preferably 500 g or more. Surprisingly, according to an embodiment of the present invention, it is also possible to provide a glass composition having an especially large crack initiation load, for example, the crack initiation load of 900 g or more, further of 1000 g or more, and particularly of 1200 g or more. The upper limit of the crack initiation load is not particularly limited, but it may be 2000 g or less. The method of measuring the crack initiation load is described in the Examples. The glass composition having the large crack initiation load is suitable for providing glass fibers having high strength against tensile stress and bending stress.

In another embodiment of the present invention, the glass composition has a crack initiation load of 300 to 550 g and a devitrification temperature TL of 1250 to 1350° C. This composition is suitable for the mass production of glass fibers having high strength.

(Relation Between High Temperature Viscosity and Devitrification Temperature)

In an embodiment of the present invention, the devitrification temperature TL of the glass composition is lower than the temperature T2, in which the logarithm of the liquid viscosity $\eta$ (units: dPa·s) (log $\eta$) of the melt of the glass composition is 2, by 20° C. or more, preferably 30° C. or more, more preferably 50° C. or more, and particularly preferably 100° C. or more. In an embodiment of the present invention, the devitrification temperature TL of the glass composition is higher than the temperature T3, in which the logarithm of the liquid viscosity $\eta$ (log $\eta$) of the melt of the glass composition is 3, but it is lower than the temperature T2.5 defined in a similar way. The methods of measuring the devitrification temperature TL and the liquid viscosity $\eta$ are described in the Examples.

In an embodiment of the present invention, the devitrification temperature TL is 1450° C. or lower, preferably 1400° C. or lower, more preferably 1380° C. or lower, and particularly preferably 1350° C. or lower.

[Glass Fibers]

The glass composition described above is suitable for use as glass fibers. In another aspect, the present invention provides glass fibers consisting of the glass composition according to the present invention. The glass fibers may be long glass fibers or short glass fibers. The long glass fibers are produced by drawing the glass melt, whose viscosity is adjusted, through a nozzle and winding it by a winding device. This continuous fibers are cut to an appropriate length when used. The short glass fibers are produced by blowing the glass melt by high pressure air, centrifugal force, etc. Since the short glass fibers have a flocculent shape, the short glass fibers may be referred to as glass wool.

[Glass Fiber Product]

Further, the long glass fibers and the short glass fibers according to the present invention can be processed into various glass fiber products. A rubber-reinforcing cord is exemplified as the glass fiber product that is particularly expected to contain glass fibers having a high Young's modulus and a large crack initiation load. The rubber-reinforcing cord contains strands made of a bundle of the long glass fibers, which are referred to as filaments. Each strand is composed of, for example, 100 to 2000 glass filaments, and typically 200 to 600 glass filaments. Each strand is often covered by a coating layer in order to improve adhesion to rubber. The description about a treatment liquid and a method for forming the coating layer, which are illustrated in detail in documents such as Patent Literature 1, is omitted.

A glass fiber nonwoven fabric is exemplified as another glass fiber product that is expected to contain glass fibers having the high Young's modulus and the large crack initiation load as characteristics. The glass fiber nonwoven fabric is a nonwoven fabric composed of glass fibers. Examples of the glass fiber nonwoven fabric include a glass paper produced by forming fine short glass fibers into a paper sheet. It is generally expected that the glass fiber nonwoven fabric has a high strength. In particular, in application such as a reinforcing member for an electrolyte membrane of a fuel cell or a separator of an electrochemical device represented by a secondary battery, the glass fiber nonwoven fabric is often required to have a high porosity. Therefore, particularly in these applications, it is highly expected to improve the strength of glass fibers.

In another aspect, the present invention provides the glass fiber product containing glass fibers according to the present invention. As described above, preferable examples of the glass fiber product include the rubber-reinforcing cord containing strands made of a bundle of the long glass fibers and the glass fiber nonwoven fabric containing the short glass fibers.

[Particulate Glass Product]

The glass composition described above is suitable for use as not only the glass fibers but also a particulate glass, particularly a glass flake. The glass flake is a scaly-shaped glass, and has, for example, an average thickness of 2 to 5 µm and an average particle diameter of 10 to 4000 µm (particularly 10 to 1000 µm). The glass flake is mass-produced by shaping molten glass by a blow process, a rotary process, etc. The particulate glass represented by the glass flake may be mixed with a base material as a filler for improving strength of the base material. The typical base material is a plastic. In recent years, particularly, a plastic part has been made smaller, and it has been required to further improve the dimensional stability and strength of the part. Therefore, it is also desirable to use the glass composition having the high Young's modulus and the large crack initiation load for the particulate glass used as a filler. The shape of the particulate glass is generally a scaly shape. However, the shape of the particulate glass is not limited as long as the shape corresponds to "particulate" of which the largest diameter is 5 mm or less.

FIG. 1 shows an example of a rubber belt containing rubber-reinforcing cords. The rubber belt 1 has a shape of a so-called toothed belt, and includes a matrix rubber 3 and a plurality of rubber-reinforcing cords 2 embedded in the matrix rubber 3. The rubber-reinforcing cords 2 are disposed in parallel with each other along a longitudinal direction of the rubber belt 1. The longitudinal direction means a direction perpendicular to a width direction along which a projecting portion 4 as "tooth" crosses the belt. A tooth sheet 5 is attached to a surface of the rubber belt 1 at which the projecting portion 4 is formed, for the purpose of preventing abrasion, etc.

EXAMPLES

Hereinafter, the present invention will be described in more detail by way of Examples.

Glass raw materials were blended at the ratios shown in Tables 1 and 2, and melted in an electric furnace maintaining a temperature of 1500 to 1600° C. for 4 hours. When the glass raw materials were melting, they were stirred several times with a stirring rod made of a quartz glass in order to ensure homogeneity of the glass. Then, the molten glass was poured into a frame made of stainless steel. Thus, a sheet-like glass was fabricated. A glass sample as measuring object was obtained by holding the sheet-like glass at a temperature that was 20 to 50° C. higher than a glass transition temperature of each glass, and then naturally cooling it to room temperature for about 8 hours. The properties described below were measured by using the glass sample that was thus obtained.

(Density)

A small piece of the glass sample was used for measuring the density by an Archimedes method in which water was used as an immersion liquid.

(Young's Modulus)

The Young's modulus was measured according to the ultrasonic pulse echo method described in Japanese Industrial Standards (JIS) R 1602-1995. Each test sample had a rectangular shape whose dimensions were 5 mm×25 mm×35 mm. The measurement was performed at room temperature under air. The device used was a model 25DL Plus manufactured by Panametrics.

It is known that when comparing glass fibers with a bulk glass consisting of the same glass composition, the glass fibers usually have a relatively low elastic modulus. It is considered that the reason for this is the fact that when the glass fibers are formed from a glass melt, the glass fibers are cooled much more quickly. However, because there is a positive correlation between an elastic modulus of the glass fibers and an elastic modulus of the bulk glass, which is an elastic modulus measured by JIS described above, it is reasonable to evaluate properties of the glass fibers or the glass composition that is used for the glass fibers by using a measured value obtained by JIS described above. In terms of particulate glass, it is also reasonable to select an appropriate glass composition by referring to an evaluation result of the elastic modulus of the bulk glass. The discussion given above applies also to the crack initiation load described in the next paragraph.

(Crack Initiation Load)

The crack initiation load was measured by a test in which a Vickers indenter was pressed against a mirror-polished surface of the glass sample. The used device was a Vickers hardness tester manufactured by Akashi Corporation. The glass sample was processed into a form of plate having parallel planes. The surface to be pressed by the indenter was mirror-polished by using a suspension of cerium oxide abrasives. The Vickers indenter was pressed against the mirror-polished surface for 15 seconds. 5 minutes after removal of a load, whether a crack emanating from the corner of the square indentation formed on the surface of the glass sample was formed, was evaluated. It was concluded by observing with a microscope incorporated in the Vickers hardness tester whether the crack was formed or not. The magnification of the microscope was 100. This measurement was repeated 10 times, and the total number of the corners in which the crack was formed was divided by 40, which was the total number of the corners of the indentation for 10 times, so as to calculate the crack occurrence probability P. The above measurement was repeated by changing the applied load in the order of 50 g, 100 g, 200 g, 300 g, 500 g, 1000 g, and 2000 g, until the probability reached 100% (P=100%), and the crack occurrence probability P was obtained at each of the applied loads. Thus, the two adjacent loads WH and WL, between which the probability of 50% (P=50%) occurred, and the crack occurrence probabilities PH and PL at these two adjacent loads (PH<50%<PL) were obtained. A straight line connecting two points (WH, PH) and (WL, PL) was drawn in a graph in which the load and the crack occurrence probability were respectively plotted on the abscissa axis and the ordinate axis. The load at which the straight line passed through the point of P=50% was defined as the crack initiation load.

(Devitrification Temperature TL)

The glass sample was pulverized. Glass particles that passed through a sieve with a aperture of 2.380 mm but stayed on a sieve with a aperture of 1.000 mm were collected. These glass particles were immersed in ethanol, subjected to ultrasonic cleaning, and then dried in a thermostatic bath. 30 to 32 g of the glass particles were placed in a platinum boat having a width of 12 mm, a length of 200 mm and a depth of 10 mm and spread in the form of an approximately constant thickness layer. Thus, a measurement sample was obtained. This platinum boat was placed in an electric furnace (a temperature gradient furnace) with a temperature gradient of 950 to 1550° C. and held therein for 2 hours. The highest temperature in a region where crystal phase distributed in the measurement sample (devitrification) was observed, was evaluated as the devitrification temperature TL.

(T2, T2.5, and T3)

T2, T2.5, and T3 were concluded by viscosities of the glass sample that were measured by a platinum ball pulling method at each temperature at intervals of 25° C. and by viscosities, between the two measured viscosities, that were calculated by the Fulcher equation.

For each obtained sample, the properties described above were measured. Tables 1 and 2 show the results. In all the Examples, the glass composition having the not-too-high specific gravity, the high Young's modulus, and the large crack initiation load was obtained.

TABLE 1

| Composition | Examples | | | | | | |
|---|---|---|---|---|---|---|---|
| | 1 | 2 | 3 | 4 | 5 | 6 | 7 |
| $SiO_2$ | 54.92 | 57.33 | 57.43 | 54.94 | 54.94 | 57.35 | 54.84 |
| $ZrO_2$ | | | | | | | |
| $Al_2O_3$ | 14.98 | 12.46 | 12.48 | 14.98 | 14.98 | 14.96 | 14.96 |
| $B_2O_3$ | | 1.00 | 1.00 | 1.00 | 1.00 | 1.00 | 1.20 |
| MgO | 24.96 | 27.92 | 23.97 | 20.48 | 22.97 | 25.48 | 27.52 |
| CaO | 4.99 | 0.16 | 3.99 | 7.49 | 4.99 | 0.15 | 0.17 |
| SrO | | | | | | | |
| BaO | | | | | | | |
| ZnO | | | | | | | |
| $Li_2O$ | | 1.00 | 1.00 | 1.00 | 1.00 | 1.00 | 1.20 |
| $Na_2O$ | 0.08 | 0.05 | 0.2 | 0.05 | 0.05 | 0.05 | 0.05 |
| $K_2O$ | | 0.01 | | 0.01 | 0.91 | 0.01 | 0.01 |
| $Fe_2O_3$ | 0.05 | 0.06 | 0.02 | 0.04 | 0.05 | 0.65 | 0.05 |
| $TiO_2$ | 0.01 | 0.01 | 9.01 | 0.01 | 0.01 | 0.01 | 0.01 |
| $Y_2O_3$ | | | | | | | |
| $La_2O_3$ | | | | | | | |
| Total | 100.00 | 100.00 | 100.10 | 100.00 | 100.00 | 100.01 | 100.00 |
| $Al_2O_3$/RO | 0.50 | 0.44 | 0.45 | 0.54 | 0.54 | 0.58 | 0.54 |
| Specific gravity | 2.65 | 2.60 | 2.61 | 2.61 | 2.62 | 2.60 | 2.62 |
| Young's Modulus [Gpa] | 102.7 | 101.8 | 100.0 | 100.9 | 102.2 | 101.9 | 101.8 |
| Crack initiation load [g] | 400 | 500 | 440 | 330 | 400 | 1000 | 400 |
| Devitrification temperature TL | 1395 | 1335 | 1280 | 1318 | 1345 | 1490 | 1345 |
| T3(logη = 3) | 1270 | 1268 | 1259 | 1270 | 1270 | 1258 | 1270 |
| T2.5(logη = 2.5) | 1340 | 1351 | 1357 | 1340 | 1340 | 1371 | 1340 |
| T2(logη = 2) | 1429 | 1458 | 1445 | 1430 | 1430 | 1462 | 1430 |

| Composition | Examples | | Comparative Examples | | | | |
|---|---|---|---|---|---|---|---|
| | 8 | 9 | 1 | 2 | 3 | 4 | 5 |
| $SiO_2$ | 54.88 | 54.87 | 61.89 | 52.43 | 86.0 | 53.60 | 57.30 |
| $ZrO_2$ | | | | | | 3.00 | 1.80 |
| $Al_2O_3$ | 14.96 | 18.95 | 11.74 | 12.48 | 17.0 | 18.00 | 17.60 |
| $B_2O_3$ | 0.50 | 1.50 | 1.54 | 0.00 | | 2.80 | |
| MgO | 28.89 | 22.94 | 23.49 | 24.97 | 17.0 | 4.30 | 8.30 |
| CaO | 0.16 | 0.14 | 0.13 | 9.99 | | | |
| SrO | | | | | | | |
| BaO | | | | | | 0.60 | |
| ZnO | | | | | | 1.50 | |
| $Li_2O$ | 0.50 | 1.50 | | | | | |
| $Na_2O$ | 0.05 | 0.05 | 1.07 | 0.03 | | | |
| $K_2O$ | | 0.01 | 0.97 | 0.01 | | | |
| $Fe_2O_3$ | 0.05 | 0.04 | 0.08 | 0.08 | | | |
| $TiO_2$ | 0.01 | 0.01 | 0.01 | 0.01 | | 2.40 | 2.40 |
| $Y_2O_3$ | | | | | | 9.80 | 6.30 |
| $La_2O_3$ | | | | | | 3.90 | 6.30 |
| Total | 100.00 | 100.00 | 100.02 | 100.00 | 100.00 | 99.90 | 100.00 |
| $Al_2O_3$/RO | 9.51 | 0.82 | 0.50 | 0.36 | 1.00 | 4.19 | 2.12 |
| Specific gravity | 2.63 | 2.65 | 2.54 | 2.70 | 2.52 | 3.51 | 3.50 |

TABLE 1-continued

| | | | | | | | |
|---|---|---|---|---|---|---|---|
| Young's Modulus [Gpa] | 104.3 | 103.2 | 92.4 | 102.4 | 97.2 | 116.4 | 113.5 |
| Crack initiation load [g] | | 600 | 1500 | 550 | 200 | | |
| Devitrification temperature TL | 1375 | 1426 | 1308 | 1280 | −1450 | 1268 | 1195 |
| T3(logη = 3) | 1270 | 1284 | 1346 | 1218 | 1415 | 1208 | 1230 |
| T2.5(logη = 2.5) | 1840 | 1359 | 1438 | 1287 | 1497 | 1258 | 1290 |
| T2(logη = 2) | 1430 | 1450 | 1550 | 1373 | 1616 | 1337 | 1374 |

RO = (MgO + CaO)
Each content of components is expressed in mol %
Each unit of TL to T2 is ° C.

TABLE 2

| | Examples | | | | | | | | Comparative Examples | | |
|---|---|---|---|---|---|---|---|---|---|---|---|
| Composition | 10 | 11 | 12 | 13 | 14 | 15 | 16 | 17 | 6 | 7 | 8 |
| Composition SiO$_5$ | 54.82 | 54.86 | 54.84 | 54.94 | 54.93 | 54.83 | 54.93 | 54.87 | 54.87 | 63.95 | 62.25 |
| ZrO$_2$ | | | | | | | | | | | |
| Al$_2$O$_3$ | 14.95 | 14.96 | 14.96 | 14.98 | 14.98 | 18.94 | 18.98 | 22.45 | 14.96 | 16.99 | 11.60 |
| B$_2$O$_3$ | | 2.49 | 2.49 | 2.00 | | | | | 7.48 | | |
| MgO | 29.90 | 24.93 | 27.42 | 20.97 | 24.97 | 25.92 | 20.97 | 22.45 | 22.45 | 8.99 | 24.83 |
| CaO | 0.18 | 0.15 | 0.16 | 4.99 | | 0.16 | 4.99 | 0.13 | 0.1.3 | 9.99 | 0.14 |
| | | | | | 4.99 | | | | | | |
| SrO | | | | | | | | | | | |
| BaO | | | | | | | | | | | |
| ZnO | | 2.49 | | 2.00 | | | | | | | |
| Li$_2$O | 0.08 | 0.05 | 0.05 | 0.05 | 0.08 | 0.08 | 0.08 | 0.05 | 0.05 | 0.05 | 1.04 |
| Na$_2$O | 0.00 | 0.01 | 0.01 | 00.1 | 0.00 | 0.00 | 0.003 | 0.01 | 0.01 | 0.002 | 0.07 |
| K2O | 0.06 | 0.05 | 005 | 0.05 | 0.05 | 0.05 | 0.04 | 0.04 | 0.04 | 0.02 | 0.07 |
| Fe$_2$O$_2$ | 0.01 | 0.01 | 0.01 | 0.01 | 0.0 | 0.01 | | 0.01 | 0.01 | 0.003 | 0.01 |
| TiO$_2$ | | | | | | | | | | | |
| Y2O$_3$ | | | | | | | | | | | |
| La$_2$O$_3$ | 100 | 100 | 100 | 100 | 100 | 100 | 100 | 100 | 100 | 100 | 100 |
| Total | 0.50 | 0.60 | 0.54 | 0.58 | 0.50 | 0.73 | 0.73 | 0.99 | 0.66 | 0.89 | 0.46 |
| Specific gravity | 2.65 | 2.58 | 2.61 | 2.60 | 2.74 | 2.64 | 2.65 | 2.64 | 2.53 | 2.57 | 2.56 |
| Young's modulus [GPa] | 104.4 | 100.7 | 101.0 | 100.0 | 100.7 | 105.2 | 103.4 | 106.2 | 94.1 | 94.8 | 96.5 |
| Crack initiation load [g] | 770 | 800 | 816 | 400 | 300 | 1000 | 404 | 1894 | 1000 | | 422 |
| Devitrification temperature TL | 1445 | 1350 | 1401 | | 1381 | 1470 | 1431 | 1520 | 1335 | 1450 | 1848 |

RO = (MgO + CaO)
Each content of components is expressed in mol %
Each unit of TL to T2 is ° C.

The invention claimed is:

1. A glass composition comprising, in mol %:
53 to 62% SiO$_2$;
13.5 to 19% Al$_2$O$_3$;
18 to 30% MgO;
0 to 8% CaO;
0 to 1.5% B$_2$O$_3$;
0.2 to 2.5% Li$_2$O;
0 to 0.2% Na$_2$O;
0 to 0.1% Y$_2$O$_3$; and
0 to 0.1% La$_2$O$_3$; wherein
the content of Li$_2$O is higher than the content of Na$_2$O,
a total content of MgO and CaO is in a range of 18 to 35 mol %,
a total content of B$_2$O$_3$ and Li$_2$O is in a range of 0.2 to 3.5 mol %,
a mol ratio calculated by Al$_2$O$_3$/(MgO+CaO) is less than 1, and
a total content of SiO$_2$, Al$_2$O$_3$, MgO, CaO, B$_2$O$_3$, Li$_2$O, and Na$_2$O is 95 mol % or more.

2. The glass composition according to claim 1, wherein the content of SiO$_2$ is 56 to 62 mol %.

3. The glass composition according to claim 1, wherein the content of SiO$_2$ is 56 to 60 mol %.

4. The glass composition according to claim 1, wherein the content of Al$_2$O$_3$ is 7.5 to 15 mol %.

5. The glass composition according to claim 1, wherein the content of B$_2$O$_3$ is more than 0 mol % and 1.5 mol % or less.

6. The glass composition according to claim 1, wherein the content of CaO is 0.1 to 8 mol %.

7. The glass composition according to claim 1, wherein the glass composition is substantially free of alkali metal oxide except for Li$_2$O and Na$_2$O.

8. The glass composition according to claim 1, wherein the glass composition is substantially free of TiO$_2$ and ZrO$_2$.

9. The glass composition according to claim 1, comprising, in mol %:
53 to 60% SiO$_2$;
11 to 15% Al$_2$O$_3$;

18 to 30% MgO;
0 to 5% CaO;
0.2 to 1.5% $B_2O_3$;
0.5 to 2.5% $Li_2O$; and
0 to 0.2% $Na_2O$; wherein
the mol ratio calculated by $Al_2O_3/(MgO+CaO)$ is 0.3 to 0.5.

10. The glass composition according to claim 1, comprising, in mol %:
53 to 60% $SiO_2$;
15 to 19% $Al_2O_3$;
18 to 30% MgO;
0 to 5% CaO;
0.2 to 1.5% $B_2O_3$;
0.2 to 1.5% $Li_2O$; and
0 to 0.2% $Na_2O$; wherein
the mol ratio calculated by $Al_2O_3/(MgO+CaO)$ is 0.5 or more and less than 1.

11. The glass composition according to claim 1, having a Young's modulus of 98 GPa or more as measured according to ultrasonic pulse echo method described in JIS R 1602-1995.

12. A particulate glass comprising the glass composition according to claim 1.

13. A glass composition comprising, in mol %:
53 to 62% $SiO_2$;
13.5 to 19% $Al_2O_3$;
18 to 30% MgO;
0 to 8% CaO;
0 to 1.5% $B_2O_3$;
0.2 to 2.5% $Li_2O$;
0 to 0.2% $Na_2O$;
0 to 0.1% $Y_2O_3$; and
0 to 0.1% $La_2O_3$; wherein
the content of $Li_2O$ is higher than the content of $Na_2O$,
a total content of MgO and CaO is in a range of 18 to 35 mol %,
a total content of $B_2O_3$ and $Li_2O$ is in a range of 0.2 to 3.5 mol %,
a mol ratio calculated by $Al_2O_3/(MgO+CaO)$ is less than 1,
a total content of $SiO_2$, $Al_2O_3$, MgO, CaO, $B_2O_3$, $Li_2O$, $Na_2O$, $K_2O$, SrO, $TiO_2$, $ZrO_2$, and T-$Fe_2O_3$ is 99 mol % or more, and
a content of each of $K_2O$ to T-$Fe_2O_3$ expressed in mol % is as follow: 0 to 0.05% $K_2O$; 0 to 5% SrO; 0 to 0.1% $TiO_2$; 0 to 0.1% $ZrO_2$; and 0 to 0.5% T-$Fe_2O_3$.

14. A glass composition comprising, in mol %:
53 to 62% $SiO_2$;
13.5 to 19% $Al_2O_3$;
18 to 30% MgO;
0 to 8% CaO;
0 to 1.5% $B_2O_3$;
0.2 to 2.5% $Li_2O$;
0 to 0.2% $Na_2O$;
0 to 0.1% $Y_2O_3$; and
0 to 0.1% $La_2O_3$; wherein
the content of $Li_2O$ is higher than the content of $Na_2O$,
a total content of MgO and CaO is in a range of 18 to 35 mol %,
a total content of $B_2O_3$ and $Li_2O$ is in a range of 0.2 to 3.5 mol %,
a mol ratio calculated by $Al_2O_3/(MgO+CaO)$ is less than 1,
a content of T-$Fe_2O_3$ is 0 to 0.5 mol %, and
the glass composition is substantially free of divalent metal oxide except for MgO, CaO, and FeO.

15. Long glass fibers comprising a glass composition, the glass composition comprising, in mol %:
53 to 62% $SiO_2$;
13.5 to 19% $Al_2O_3$;
18 to 30% MgO;
0 to 8% CaO;
0 to 1.5% $B_2O_3$;
0.2 to 2.5% $Li_2O$;
0 to 0.2% $Na_2O$;
0 to 0.1% $Y_2O_3$; and
0 to 0.1% $La_2O_3$; wherein
the content of $Li_2O$ is higher than the content of $Na_2O$,
a total content of MgO and CaO is in a range of 18 to 35 mol %,
a total content of $B_2O_3$ and $Li_2O$ is in a range of 0.2 to 3.5 mol %, and
a mol ratio calculated by $Al_2O_3/(MgO+CaO)$ is less than 1.

16. A rubber-reinforcing cord comprising a strand in which the long glass fibers according to claim 15 are bundled.

17. Short glass fibers comprising a glass composition, the glass composition comprising, in mol %:
53 to 62% $SiO_2$;
13.5 to 19% $Al_2O_3$;
18 to 30% MgO;
0 to 8% CaO;
0 to 1.5% $B_2O_3$;
0.2 to 2.5% $Li_2O$;
0 to 0.2% $Na_2O$;
0 to 0.1% $Y_2O_3$; and
0 to 0.1% $La_2O_3$; wherein
the content of $Li_2O$ is higher than the content of $Na_2O$,
a total content of MgO and CaO is in a range of 18 to 35 mol %,
a total content of $B_2O_3$ and $Li_2O$ is in a range of 0.2 to 3.5 mol %, and
a mol ratio calculated by $Al_2O_3/(MgO+CaO)$ is less than 1.

18. A glass fiber nonwoven fabric comprising the short glass fibers according to claim 17.

* * * * *

UNITED STATES PATENT AND TRADEMARK OFFICE
CERTIFICATE OF CORRECTION

PATENT NO. : 11,760,684 B2
APPLICATION NO. : 16/624794
DATED : September 19, 2023
INVENTOR(S) : Nakamura et al.

Page 1 of 1

It is certified that error appears in the above-identified patent and that said Letters Patent is hereby corrected as shown below:

In the Claims

Claim 1, Column 13, Line 51: Delete "13.5 to 19% $Al_2O_3$;" and insert --7.5 to 19% $Al_2O_3$;--.

Claim 13, Column 15, Line 28: Delete "13.5 to 19% $Al_2O_3$;" and insert --7.5 to 19% $Al_2O_3$;--.

Claim 14, Column 15, Line 51: Delete "13.5 to 19% $Al_2O_3$;" and insert --7.5 to 19% $Al_2O_3$;--.

Claim 15, Column 16, Line 16: Delete "13.5 to 19% $Al_2O_3$;" and insert --7.5 to 19% $Al_2O_3$;--.

Claim 17, Column 16, Line 37: Delete "13.5 to 19% $Al_2O_3$;" and insert --7.5 to 19% $Al_2O_3$;--.

Signed and Sealed this
Eleventh Day of November, 2025

John A. Squires
*Director of the United States Patent and Trademark Office*